May 18, 1954  E. A. STALKER  2,678,537
AXIAL FLOW TURBINE TYPE HYDRAULIC TORQUE CONVERTER
Filed March 12, 1949  6 Sheets-Sheet 3

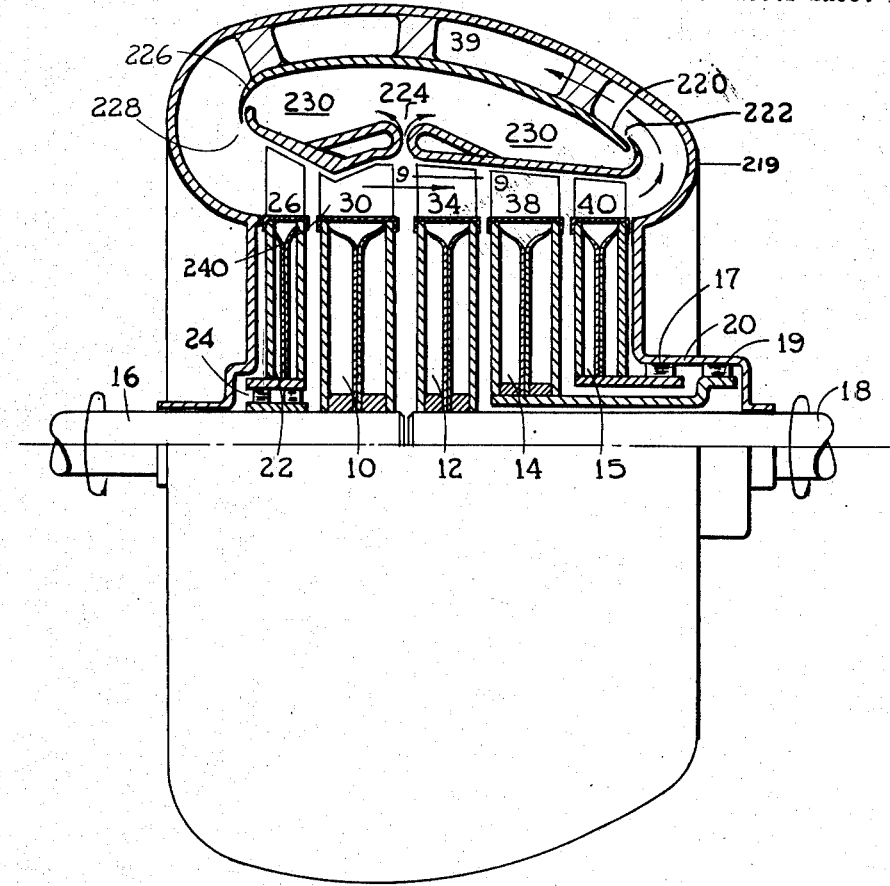
Fig. 1
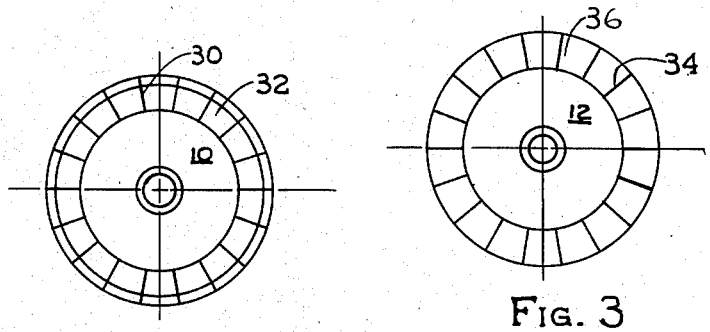
Fig. 2
Fig. 3
INVENTOR.
Edward H. Stalker

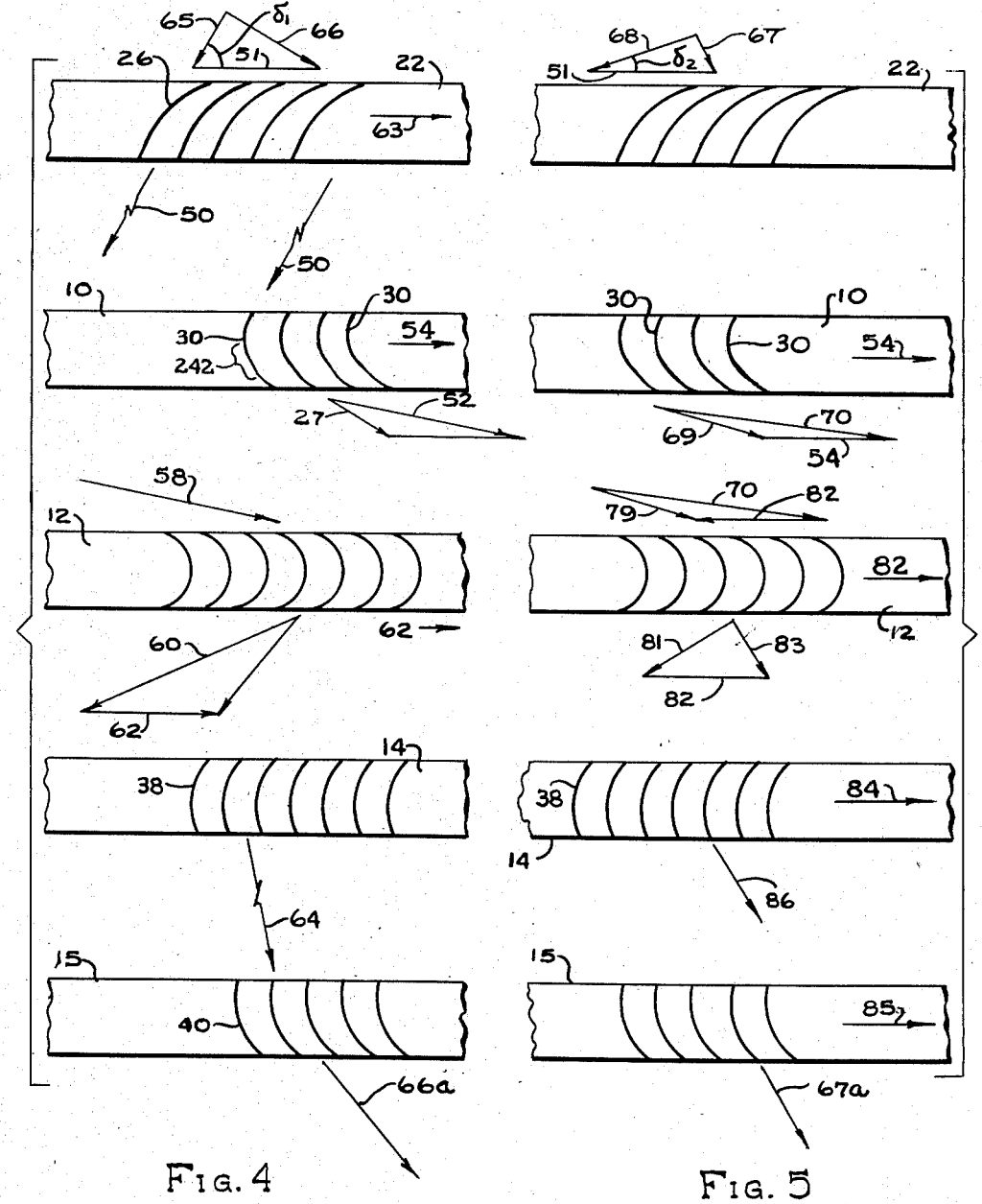

INVENTOR.
Edward A. Stalker

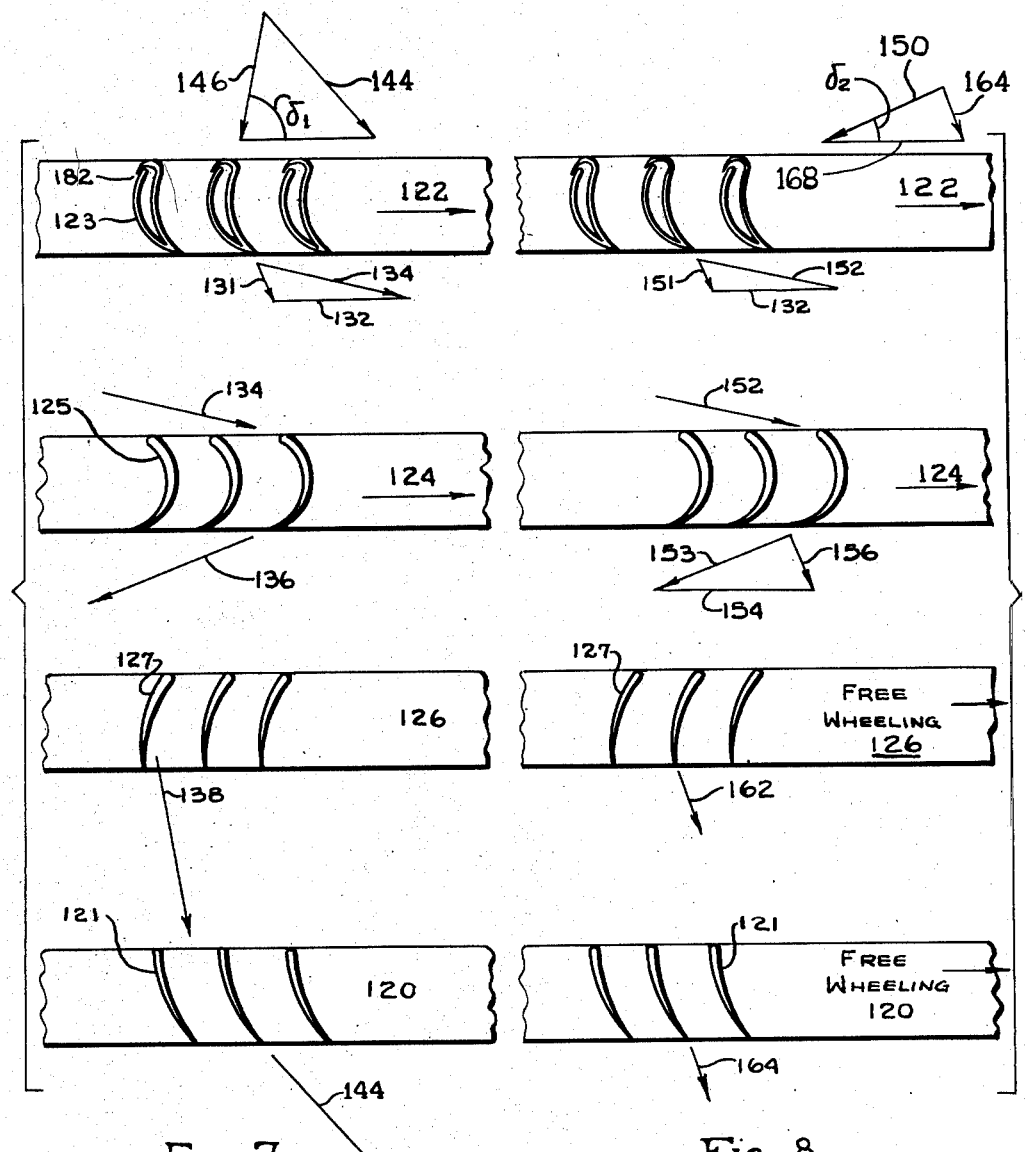

May 18, 1954  E. A. STALKER  2,678,537
AXIAL FLOW TURBINE TYPE HYDRAULIC TORQUE CONVERTER
Filed March 12, 1949  6 Sheets-Sheet 5

INVENTOR.
Edward A Stalker

May 18, 1954  E. A. STALKER  2,678,537
AXIAL FLOW TURBINE TYPE HYDRAULIC TORQUE CONVERTER
Filed March 12, 1949  6 Sheets-Sheet 6

INVENTOR.
Edward A. Stalker

Patented May 18, 1954

2,678,537

UNITED STATES PATENT OFFICE 2,678,537

AXIAL FLOW TURBINE TYPE HYDRAULIC TORQUE CONVERTER

Edward A. Stalker, Bay City, Mich.

Application March 12, 1949, Serial No. 81,104

7 Claims. (Cl. 60—54)

This invention relates to fluid transmissions and particularly to fluid transmissions capable of magnifying the driving torque. Such transmissions are commonly called torque converters.

An object of the invention is to provide a fluid transmission which is highly efficient.

Another object is to provide a fluid transmission which is economical to fabricate.

Another object is to provide a fluid transmission employing axial flow wheels.

Still another object is to provide slot means in a fluid transmission for directing the fluid flow about the blades.

Another object is to provide in an axial flow fluid transmission a pump rotor of the radial diffusion type.

Still another object is to provide axial flow wheels in an axial flow transmission in such proportions that the rate of fluid flow decreases as the turbine wheel increases in speed of rotation.

Other objects will appear from the description drawings and claims.

The above objects are accomplished by the means illustrated in the accompanying drawings in which—

Figure 1 is a part axial section through a fluid transmission;

Figure 2 is a front view of the pump rotor in Fig. 1;

Figure 3 is a front view of the turbine rotor in Figure 1;

Figure 4 is a development of the wheels together with their flow vectors for the case of the turbine wheel not rotating;

Figure 5 is similar to Figure 4 except that the turbine wheel is rotating at high speed;

Figure 7 is a fragmentary development of the blading of the transmission of Figure 6 with the turbine wheel stationary;

Figure 8 is a fragmentary development of the blading of Figure 6 with the turbine wheel turning at high speed and substantially no torque magnification;

Figure 6:
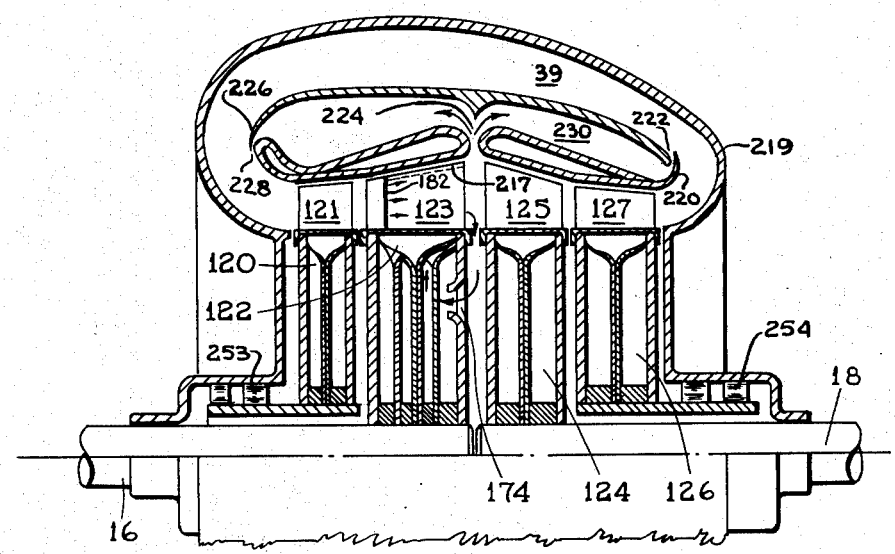
Figure 6 is a part axial section through an alternate transmission.

This application is a companion to my application, Serial No. 81,105 filed March 12, 1949 entitled "Fluid Torque Converters," now abandoned.

Referring to Fig. 1 of the drawings the pump wheel is 10, the turbine wheel is 12, the first reaction wheel is 14 and the second reaction wheel is 15. The pump wheel is fixed to the power input or driving shaft 16 while the turbine wheel is fixed to the output or driven shaft 18. The reaction wheels are mounted on free wheeling units 17 and 19 on the stationary structure 20. The secondary pump wheel or rotor 22 is mounted on the pump shaft 16 by means of the free wheeling device 24 which permits the rotor to overrun the shaft but not to lag behind the shaft. The secondary pump wheel blades are 26, spaced about the wheel perimeter.

The pump wheel 10 has a plurality of blades 30 spaced about its perimeter forming a plurality of flow passages 32 between adjacent blades. See Figure 2.

These passages increase in radial depth and transverse cross sectional area between inlet to exit.

The turbine wheel, Figs. 1 and 3, has a plurality of blades 34 spaced about its periphery forming a plurality of flow passages 36 between adjacent blades. These passages decrease in cross sectional area from inlet to exit and preferably the blades are reduced in radial length from inlet to exit as shown.

The reaction wheels 14 and 16 preferably have at their periphery blades 38 and 40 which reduce in radial length from the front to the rear of the wheel.

All these wheels are axial flow bladed rotors. Axial flow wheels are characterized by the inlets and exits of the wheel passages being at substantially similar distances from the wheel axis.

When the pump wheel is rotated it delivers fluid through the passages between its blades to the passages between the blades of the turbine and the reaction wheels. The fluid is returned to the inlet of the pump rotor by way of the annular working conduit 39 extending about the periphery of the transmission and enclosing said wheels.

The flow of fluid from the pump exerts a torque about the axis of the shafts 16 and 18. The wheels 14 and 15 and the blades 26 of the rotor 22 direct the fluid on to the blades of the pump wheel to aid the rotation and hence magnify the value of the torque which is applied to the turbine as compared to the pump shaft torque.

As the speed of the pump wheel increases it applies sufficient torque to turn the turbine wheel and drive the driven shaft.

The relation of the flow to the respective wheels is best described in conjunction with a development of the blading and their vector diagrams.

In Figure 4 is shown a fragmentary development of the blading of the wheels when the turbine wheel is not turning and its torque is a maximum.

The fluid approaches the pump rotor 10 in the direction 50 and is turned by the rotor blades to the direction given by vector 52 which is the resultant or absolute velocity vector. The pump rotor blades 30 have the peripheral speed 54 at about mid point of their spans.

The fluid approaches the turbine blades along vector 58 which has the same magnitude and direction as vector 52. The turbine blades turn this fluid to the direction 60. As a consequence the turbine has exerted upon it a torque tending to turn it in the direction 62. The fluid next enters reaction wheel or member 14 which is stationary. It deflects the fluid along vector 64. The fluid is deflected further by reaction wheel or member 15 to the direction of vector 66a.

The fluid leaves the member 15 and flows through the annular conduit 39 to the front end of the transmission or torque converter. In Figure 4 the vector 66a changes to vector 66 of reduced velocity just ahead or upstream from the secondary pump rotor 22. This rotor will free wheel in the direction 63 because the resultant of vectors 66 and 63 attacks the blade at sufficiently negative angle, that is along vector 65. Since the rotor rotates freely ahead of the pump wheel it will not significantly change the direction of the flow approaching the pump wheel 10. Therefore vectors 65 and 50 are substantially parallel.

Since the vector 66 represents spin in the fluid in the direction of rotation of the pump wheel the pump has to exert a smaller torque on the fluid than is received by the turbine. There is therefore a conversion or magnification of the pump torque.

In Figure 5 the secondary pump rotor 22 tends to lag behind pump wheel 10 and becomes locked to it through the agency of the free wheeling device.

The fluid approaches the pump rotor as vector 67 which combined with the peripheral velocity 51 gives the absolute vector 68. The fluid leaves the pump wheel 10 in the relative direction 69 and the absolute direction 70.

The fluid enters the turbine as vector 79, the resultant of 70 and the peripheral vector 82. It leaves the turbine along 81 giving the absolute velocity vector 83. The fluid passes through the free wheeling wheels 14 and 15 without significant change in directions which are indicated respectively as 86 and 67a. Due to variation in the cross section of passage 39 vector 67a becomes 67 just ahead of rotor 22.

The fluid can enter the pump wheel with low shock losses for all conditions of operation because of the ability of the secondary rotor to free wheel. This is well known in the art.

The blades of pump wheel 10 are bent forward at their aft ends so that the absolute velocity vector 52 has a large magnitude due to the additions of vectors 27 and 54, and also a very small angle with the transverse plane, that is the plane of rotation. With such values the angle of approach varies very little from the condition where the turbine wheel is stopped as in Figure 4 to the condition where the turbine wheel is rotating at high speed as in Figure 5. This is a very important feature since not only are the shock losses reduced, but also great economies in fabrication can be had from sheet metal fabrication which can be used if the angular variation is small.

The inlet area of the secondary pump wheel is shown somewhat larger than the exit area of the turbine wheel. Also the peripheral velocity component of the vector 67 is about equal to the peripheral component of vector 83. Also vector 83 has almost the same magnitude and direction as the vector 67. If they were equal and the secondary pump, the pump wheel and the turbine wheel all rotated together as a rigid rotor there would be no pumping action. Since this condition is almost attained the pumping action is very small which accounts for the low value of the axial velocity components of vectors 67 and 83 as compared to the axial magnitudes in Fig. 4.

It is desirable for the design condition of operation that the rate of flow in the transmission be small to avoid fluid energy losses. Since the losses are proportional to the square of the fluid velocity, a low value of the latter makes for very low losses.

At the design condition when no torque magnification is desired, the turbine speed approaches closely the speed of the pump.

Fluid in passing through the pump wheel 10 experiences a static pressure rise which makes vector 27 small as compared to 50. The increasing radial depth giving a greater exit area than inlet area to the passages between blades causes the static pressure rise. This static pressure is converted to velocity in the turbine resulting in vector 60 being larger than 58. Thus when the secondary pump rotor is free wheeling the pump wheel 10 gives more pumping action than when the secondary rotor is fixed to the shaft and rotating at the same velocity as the pump wheel. Or in other words when the secondary rotor rotates with the pump wheel the pumping action is reduced because the exits of the pump passages are then smaller than the inlets. This reduction is desirable because at high turbine speeds a low fluid flow is desirable.

It is to be noted with respect to Figures 1, 4 and 5 that the flow cross section just ahead of rotor 22 is larger than that just aft of rotor 15. This provides a reduction in axial velocity without altering the peripheral component. Thus in Figure 4 for instance the peripheral velocity component of vector 66 is equal to that of 66a. The use of these relative sizes of flow cross sectional areas brings the angles of approach nearer to equality for a wide range of turbine speeds relative to the pump. This is readily seen by considering that the inlet cross section becomes very large. Then the axial velocity would approach zero and the approach vectors 65 and 68 in Figures 4 and 5 would both be almost parallel to the plane of rotation.

In the general case, the condition for no pumping action by the combined pumps and turbine wheels is that: The blade angles, and inlet and exit areas of the pump and turbine respectively are to be arranged so that if the pump and turbine wheels are rotated at the same speed, no increment of peripheral component of velocity would be added to the fluid in passing through said wheels.

In another form of the invention as shown in Figure 6 the secondary pump rotor is omitted and a reaction wheel 120 is positioned ahead of the pump wheel 122. This wheel 122 is followed by a turbine wheel 124 and a reaction wheel 126.

In order that the pump blades can accommodate a relatively wide range of angles of approach of the fluid, they are each provided with a slot in their surface through which a flow is induced to compel the main flow to follow the blade surface.

The vector diagrams of Figs. 7 and 8 show the blade developments and graphically the reason for the use of slotted blades.

In Figure 7 the two reaction wheels 120 and 126 are stationary. The flow from the pump wheel is 131 which combined with the peripheral vector 132 gives the absolute vector 134 which relates the flow to the turbine wheel assumed to be stationary. The flow vectors 136 and 138 have positive angles of attack relative to the blades 127 and 121 so the wheels are made stationary. The vector of the flow leaving reaction wheel 120 is 144. This vector combined with the peripheral vector of the pump gives the approach vector 146.

The approach vector to the pump in Figure 8, where the turbine wheel is rotating fast, is 150 and it is clear that the angle $\delta_1$ in Fig. 7 is considerably larger than the angle $\delta_2$ in Fig. 8.

The flow approaches the turbine blades along vector 152 and leaves along vector 153 which combined with the peripheral vector 154 gives the absolute vector 156. Since the wheels 126 and 120 are now free wheeling because of the negative approach of the fluid, the vectors 162 and 164 are almost parallel. Vector 164 is repeated just ahead of the pump and in combination with the peripheral vector 168 for the pump gives the approach vector 150 as previously referred to.

Figure 9:
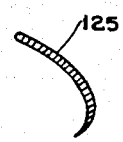
Figure 9 is a section along line 9—9 of the turbine blade, Figure 1.
Figure 10:
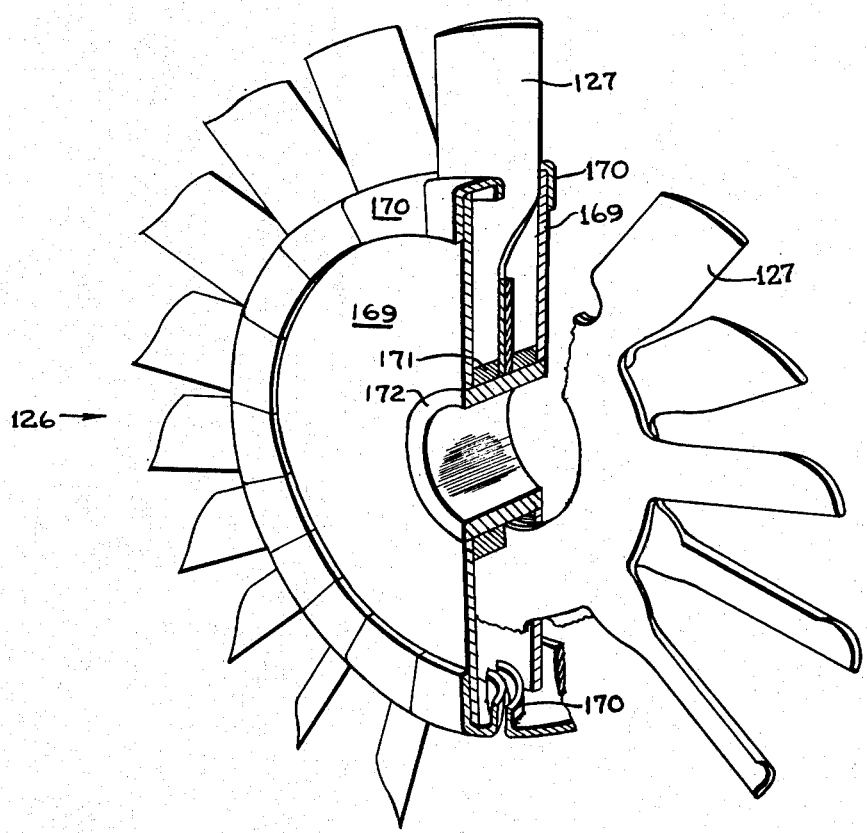
Figure 10 is a perspective view of a pump rotor partly in section.

The blades of the turbine and reaction wheels are simple curved sheets with rounded leading edges and sharpened trailing edges as shown in Figure 9. Figure 10 shows how reaction wheel 126 is made from simple sheet metal stampings. The turbine and reaction wheels are made similarly. All the blades are stamped integral with their central plate portion. Alternate blades are on one plate and the interdigitating blades are on the other plate. Since none of the blades of any one plate overlap each other, each plate with its blades can be stamped in one operation. The side disks 169, rim segments 170 and the hub members 171 and 172 are bonded by furnace brazing to form the complete wheel. It may be fixed to the shaft 18 by brazing also in forming the turbine.

Figure 11:
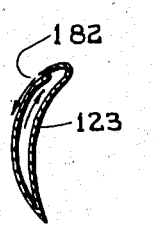
Figure 11 is a section along line 11—11 of the pump blade in Figure 12.

Figure 11 shows a section of the pump blade 120 whose discharge slot 182 receives a flow of fluid from the openings 184 (see Fig. 12) in the rotor disk.

Figure 12:
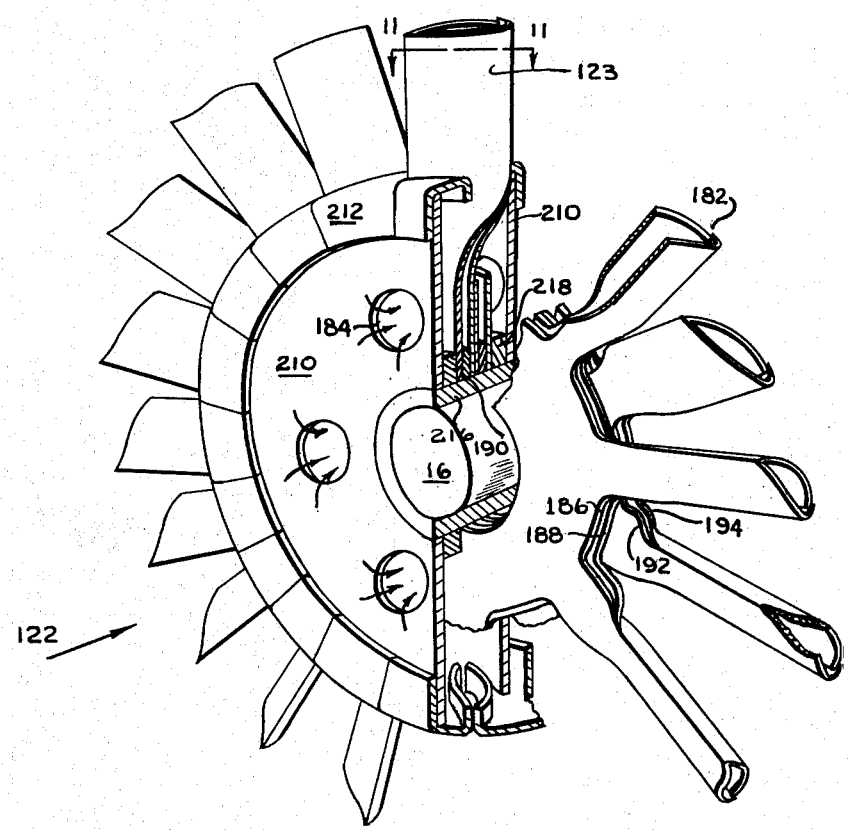
Figure 12 is a perspective view of the rotor with slotted blades, with part of the rotor in section.

As shown in Figure 12 the plates 186 and 188 from which one group of the blades are formed are spaced apart by spacers 190 so that fluid can reach the interiors of the blades at their root ends. The other group of blades of this same wheel are formed from plates 192 and 194 in a similar manner and the blades of one group interdigitate with the blades of the other group to provide the rotor with its full set of blades.

The side plates 210 and rim segments 212 make up the rotor exterior. These plates and the blade plates are bonded to the hub members 216 and 218 which are fixed to the shaft 16. The blades, segments and plates are preferably bonded by a furnace brazing process. The blades of Fig. 12 are shown without the blade plugs 217 shown in Fig. 6 for closing the blade tips.

The case 219 houses the wheels and provides the annular conduit 39 to conduct the flow back to the front of the transmission. It also provides a chamber for serving fluid to control the flow on the conduit walls.

The inner wall 220 of the bend in the conduit 39 is provided with a slot 222 to induce the fluid to follow the wall without separation. This slot receives fluid from peripheral opening 224 served with fluid pressure from pump wheel 10. The wall 226 has the slot 228 for the same purpose and receives fluid under pressure from the annular chamber 230 constituting a separate duct means for supplying fluid to slots 222 and 228.

Figure 13:
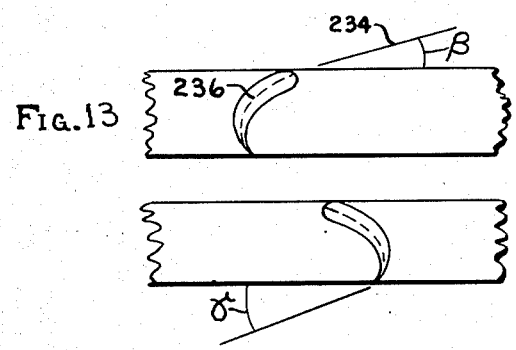
Figure 13 is a diagram defining the inlet angle for the flow relative to a wheel.
Figure 14:
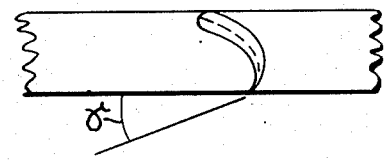
Figure 14 is a diagram defining the exit angle for the flow relative to the wheel.

The angle between the tangent 234 to the mean line 236 of the blade section at the leading edge and the plane of rotation is called the entrance or inlet angle $\beta$. A tangent at the trailing edge defines with the plane of rotation a discharge angle $\gamma$. These are shown in Figs. 13 and 14.

The axial flow pump wheel is a special type. It is characterized by each passage between blades having a smaller radial depth at inlet than at exit. In other words the annular exit area of the wheel is substantially larger than the annular inlet area of the wheel. Preferably the radial depth at exit is from 2 to 3 times the radial depth at the inlet to each passage between blades. The inner radial limits of the fluid passages at the inlet and outlet of pump rotor 30 are substantially the same distance from the axis of rotation; the direction of fluid flow therethrough thus is in a general axial direction.

The pumping action of this type of rotor depends on the increasing pressure arising from the slowing down of the fluid in the rotor passage after the manner of Bernoulli's formula. Thus the fluid reaches the pump exit with very little axial velocity. The fluid leaving the rotor has a high static pressure and in addition is given a spin in the direction of rotation. This type of pumping action is described in more detail in my pending application Serial No. 687,385 filed July 31, 1946. Another advantage of this type of pump wheel is that it can efficiently accommodate a wider range of angle of approach of the fluid than the conventional axial flow type even with unslotted blades.

The pump wheel as shown in Figure 1 has a converging portion succeeded by a diverging portion thereby defining a throat 240. Since the static pressure of the fluid will be low at the throat the fluid can be made to follow about a nose or leading edge curvature of the blade of small radius without separation from the blade surface along the inlet portion of the blade. In other words the fluid is flowing into a region of low pressure and can therefore accomplish a sharper turn without shock losses.

It will also be noted that the main curve of the blade is located just ahead of the throat 240 (see Fig. 1) so that the flow will be accelerated while making the turn along the curved inlet portion. Following the curve the blade has a substantially straight portion 242 (see Fig. 4) along the length of the passage where it is expanding in radial depth. When the blade is again curved the passage assumes a substantially uniform radial depth so that the turn of the fluid along the aft end of the blade, the curved aft portion, is not accomplished against an increasing static pressure. Instead of a constant radial depth of the curved aft portion, a slightly decreasing depth might also be employed.

The form of the blade and passage provides for turning the fluid through a great angle without separation and the resulting energy losses. The pump wheel of Figure 6 may also be made with a like arrangement of throat and curvatures.

The turbine and reaction wheels are preferably made with decreasing radial depth from inlet to exit of their passages between blades. This will accelerate the flow through them and keep fluid losses to a minimum by preventing separation of the fluid from the curved surfaces.

The reaction wheels 120 and 126 are mounted on the case 219 by free wheeling units 253 and 254 respectively. They lock against turning counter to the direction of rotation of the turbine.

I have used the term wheel to indicate either a rotor or a stator. The fluid transmissions described could if desired have their reaction wheels fixed. This might be done where efficiency is not important but initial cost is.

Figure 15:
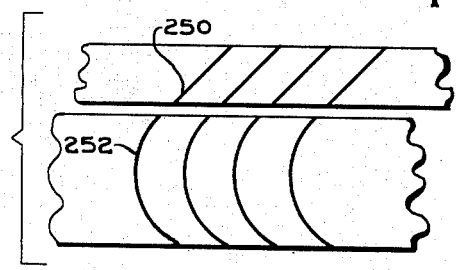
Figure 15 is a fragmentary development of the blading of an auxiliary pump rotor and pump wheel.

The secondary pump rotor 22 is used in Figure 1 primarily to receive the fluid into the pump at the small approach angle $\delta_2$ instead of the angle $\delta_1$ for which the pump wheel 10 is designed. There is however another advantage in using the secondary pump rotor where the radial depth of the rotor passages decreases from inlet to exit, even when the presence of the secondary pump rotor does not change the entrance angles, as shown in Figure 15. Here the blades 250 have the same angularity as the forward portions of the blades 252. When the secondary and main pump wheels rotate as a unit the pumping action due to a change in cross section is lost if the inlet area to the secondary wheel is equal to the exit area of the pump wheel. This is desirable for the regime of low torque magnification.

Figure 16:
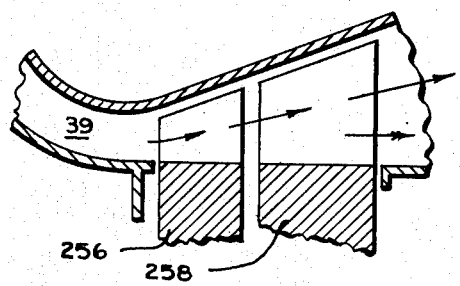
Figure 16 is a fragmentary section of an alternate auxiliary pump rotor and pump wheel shown in relation to a fragment of a transmission case.

In some applications where high efficiency should be maintained near the peak value over a wide range of torque magnification, it may be desirable to employ an auxiliary rotor 256 such as shown in Figure 16 with the inlet radial depth smaller than the exit radial depth of the blades. That is rotor 256 and pump wheel 258 would replace 22 and 10 respectively in Figure 1.

The reason for having the secondary rotor of smaller inlet area than the pump inlet area is that in the low torque regime (high turbine speed) the vector approaching the secondary rotor will be relatively steeper while in the high torque regime where the secondary rotor is free wheeling the approach vector to the main pump wheel will be relatively flatter. Then the blades of the two wheels can be given more nearly the same inlet angles.

Although the hub structures shown are cylindrical it is to be understood that one side of the hub may be of smaller diameter than the other, making in effect a conical frustrum. In fact a cylinder is a limiting case of a conical frustrum, the case where the angle between the base and sides becomes a right angle. The cylindrical or conical surface may conveniently be called the peripheral surface.

If no magnification of the torque is desired the reaction wheels are omitted. The transmission then becomes a simple fluid coupling consisting of the pump and turbine wheels.

The axial flow transmission is particularly adopted to stampings or sheet metal fabrication since there are no rotating cases which are subjected to high centrifugal pressures as in the Föttinger type which employs radial (centrifugal) pumps and turbines. The combination of axial flow with sheet metal stampings and the like represents a significant advance since it makes this economical type of fabrication suitable for fluid torque converters with the retention of simple forms for the sheet metal parts.

While I have illustrated specific forms of the invention, it is to be understood that variations may be made therein and that I intend to claim my invention broadly as indicated by the appended claims.

I claim:

1. In combination in a fluid transmission, an axial flow pump wheel, an axial flow turbine wheel, an axial flow reaction wheel, means mounting said wheels in downstream tandem relation in the order named for rotation about their respective axes, said wheels each having a plurality of blades spaced about its perimeter defining therebetween a plurality of wheel flow passages to direct fluid in the general direction of said wheel axis, and conduit means cooperating with said wheels to define a fluid circuit for circulating fluid through said wheel passages from one wheel to another, each said passage between adjacent said blades of said pump wheel having a greater radial depth and area at the exit than at the inlet of each said pump wheel passage.

2. In combination in a fluid transmission, an input shaft mounted for rotation, an axial flow pump wheel mounted on said shaft to be rotated thereby, an output shaft mounted for rotation, a turbine wheel mounted on said output shaft and having flow passages therethrough, said pump wheel having a plurality of peripherally spaced blades defining flow passages therebetween for directing fluid in the general direction of said pump wheel axis, each said pump wheel passage having a greater radial depth at its exit than at its inlet, and conduit means cooperating with said wheels to define a fluid circuit to conduct fluid through said wheels in succession through said passages thereof and from the exits of said turbine wheel passages to the inlets of said pump wheel passages.

3. In combination in a fluid transmission, an axial flow pump wheel, an axial flow turbine wheel, an axial flow reaction wheel, means mounting said wheels in downstream tandem relation for rotation about their respective axes, said wheels each having a plurality of axial flow blades spaced about its perimeter with a plurality of flow passages therebetween extending in the general direction of its said axis, and conduit means enclosing said wheels to define a fluid circuit therewith for guiding fluid through said wheels in succession through said passages thereof, each passage between adjacent said blades of said turbine wheel having a greater radial depth and cross sectional area at the inlet than at the exit of said passage, said inlet and exit of each said passage of said turbine wheel being at substantially similar distances from said axis of said turbine wheel.

4. In combination in a fluid transmission, an axial flow pump wheel, an axial flow turbine wheel, an axial flow reaction wheel, means mounting said wheels in downstream tandem relation for rotation about their respective axes, said wheels each having a plurality of radial flow blades spaced about its periphery with a plurality of flow passages therebetween extending in the general axial direction, and conduit means enclosing said wheels to define therewith a fluid circuit for guiding fluid through said wheels in succession through the passages thereof, each passage between adjacent said blades of said reaction wheel having a greater radial depth at the inlet than at the exit thereof, said conduit means closely conforming to the tips of the blades of said reaction wheel along substantially the whole tip length of each said blade.

5. In combination in a fluid transmission, an axial flow pump wheel, an axial flow turbine wheel, an axial flow reaction wheel, means mounting said wheels in downstream tandem relation for rotation about their respective axes, each said wheel having a plurality of blades spaced about its perimeter with a plurality of flow passages therebetween for directing a working fluid therethrough in the general axial direction, and a plurality of walls cooperating with said wheels defining a curved working conduit means enclosing said wheels in the interior thereof providing for circulating said fluid through said wheels in succession through said passages thereof, a curved portion of said walls having a discharge slot therein leading into said interior of said conduit means for directing fluid downstream along an interior surface thereof, said plurality of walls also defining separate duct means providing a flow path separate from said working conduit means, said separate duct means communicating between said slot and a region of said fluid in said working conduit means adjacent to a side of a said wheel, said region being spaced along said conduit means a substantial distance from said slot providing a fluid pressure difference to induce an auxiliary flow of fluid through said separate duct means and said discharge slot to control the working fluid flow bathing said interior surface of said curved wall.

6. In combination in a fluid transmission, an axial flow pump wheel, an axial flow turbine wheel, an axial flow reaction wheel, means mounting said wheels in downstream tandem relation for rotation about their respective axes, each said wheel having a plurality of blades spaced about its perimeter with a plurality of flow passages therebetween for directing a working fluid therethrough in the general axial direction, and a plurality of walls cooperating with said wheels defining a curved working conduit means enclosing said wheels in the interior thereof providing for circulating said fluid through said wheels in succession through said passages thereof, a curved portion of said walls having a discharge slot therein leading into said interior of said conduit means for directing fluid downstream along an interior surface thereof, said plurality of walls also defining separate duct means providing a flow path separate from said working conduit means, said auxiliary duct means communicating between said slot and a source of fluid under pressure to induce an auxiliary flow of fluid through said separate duct means and said discharge slot to control the working fluid flow bathing said interior surface of said curved wall.

7. In combination in a fluid transmission, an axial flow pump wheel, an axial flow turbine wheel, an axial flow reaction wheel, means mounting said wheels in downstream tandem relation for rotation about their respective axes, each said wheel having a plurality of blades spaced about its perimeter with a plurality of flow passages therebetween for directing a working fluid therethrough in the general axial direction, and a plurality of walls cooperating with said wheels defining a curved working conduit means enclosing said wheels in the interior thereof providing for circulating said fluid through said wheels in succession through said passages thereof, a curved portion of said walls having a discharge slot therein leading into said interior of said conduit means for directing fluid downstream along an interior surface thereof, said plurality of walls also defining separate duct means providing a flow path separate from said working conduit means, said auxiliary duct means communicating between said slot and a region of said fluid in said working conduit means adjacent to the downstream side of said pump wheel, said slot being spaced a substantial distance from said pump wheel providing a fluid pressure difference to induce an auxiliary flow of fluid through said separate duct means and said discharge slot to control the working fluid flow bathing said interior surface of said curved wall.

References Cited in the file of this patent

UNITED STATES PATENTS

| Number | Name | Date |
|---|---|---|
| 1,404,346 | Delery | Jan. 24, 1922 |
| 1,430,141 | Angus | Sept. 26, 1922 |
| 1,855,967 | Jandasek | Apr. 26, 1932 |
| 1,993,741 | Jandasek | Mar. 12, 1935 |
| 2,002,760 | Wilson | May 28, 1935 |
| 2,382,034 | Wemp | Aug. 14, 1945 |
| 2,389,174 | Whitworth | Nov. 20, 1945 |
| 2,463,582 | Wemp | Mar. 8, 1949 |
| 2,471,179 | Wemp | May 24, 1949 |